(12) United States Patent
Frenkel (10) Patent No.: US 7,762,032 B2
(45) Date of Patent: Jul. 27, 2010

(54) SYSTEMS AND METHODS FOR PROVIDING A UTILITY LINE PROTECTION PLATE

(75) Inventor: Jillian M. Frenkel, Roswell, GA (US)

(73) Assignee: One Smart Chick, LLC, Roswell, GA (US)

( * ) Notice: Subject to any disclaimer, the term of this patent is extended or adjusted under 35 U.S.C. 154(b) by 173 days.

(21) Appl. No.: 11/780,857

(22) Filed: Jul. 20, 2007

(65) Prior Publication Data
US 2009/0020329 A1    Jan. 22, 2009

(51) Int. Cl.
*E04B 1/94* (2006.01)
*E04B 2/00* (2006.01)
*H01B 7/00* (2006.01)
*H02G 3/34* (2006.01)

(52) U.S. Cl. ............ 52/317; 52/506.01; 174/135; 174/507

(58) Field of Classification Search ......... 174/507, 174/317, 135; 52/317, 696, 843, 474, 506.01, 52/204.2, 220.1, 27
See application file for complete search history.

(56) References Cited

U.S. PATENT DOCUMENTS

| | | | | |
|---|---|---|---|---|
| 498,563 | A * | 5/1893 | Montgillion | 52/317 |
| 1,075,845 | A * | 10/1913 | Mills | 52/843 |
| 1,412,736 | A * | 4/1922 | Hamilton | 52/317 |
| 1,867,449 | A * | 7/1932 | Ecket et al. | 52/100 |
| 2,178,388 | A | 10/1939 | Beckman | |
| 2,277,758 | A * | 3/1942 | Hawkins | 52/98 |
| 2,994,114 | A * | 8/1961 | Black | 52/317 |
| 3,240,869 | A | 3/1966 | Jureit | |
| 3,553,346 | A | 1/1971 | Ballantyne | |
| 3,689,681 | A * | 9/1972 | Searer et al. | 174/507 |
| 3,717,970 | A * | 2/1973 | Rosenblum | 52/514 |
| 4,050,205 | A | 9/1977 | Ligda | |
| 4,453,362 | A * | 6/1984 | Rodgers | 52/481.1 |
| 4,586,550 | A | 5/1986 | Kitipornchai | |

(Continued)

FOREIGN PATENT DOCUMENTS

EP    0896408    10/1999

OTHER PUBLICATIONS

Webpage dated Mar. 16, 2007, showing a Box Nail Plate (http://www.unifireusa.com/retail1/item.php?c1=HALEX%20(ADALET)&nameIT=Conduit%20Nail%20Plate&vn=70250&blkNO=1025-8077) 1pg.

*Primary Examiner*—Richard E Chilcot, Jr.
*Assistant Examiner*—Andrew J Triggs
(74) *Attorney, Agent, or Firm*—Sutherland Asbill & Brennan LLP (57) ABSTRACT

Embodiments of the invention are directed to systems and methods for providing a utility line protection plate. In one embodiment of the invention, a system for providing a utility line protection plate can include at least two plate portions configured to resist impact of a penetrating object. The system can also include at least one hinge mounted to the at least two plate portions, wherein the at least one hinge permits the plate portions to be manipulated to a substantially parallel orientation with respect to each other. Furthermore, the system can include at least one mounting device adjacent to an edge of either of the at least two plate portions, wherein the mounting device is configured to permit mounting of the at least two plate portions between two adjacent wall studs.

7 Claims, 4 Drawing Sheets

U.S. PATENT DOCUMENTS

| | | | |
|---|---|---|---|
| 4,658,556 A * | 4/1987 | Jenkins | 52/317 |
| 4,807,417 A | 2/1989 | Bell | |
| 4,862,667 A * | 9/1989 | Melland | 52/847 |
| 4,924,646 A * | 5/1990 | Marquardt | 52/220.1 |
| 5,163,254 A | 11/1992 | Zastrow et al. | |
| 5,216,859 A | 6/1993 | Moreno et al. | |
| 5,546,716 A * | 8/1996 | Broxterman et al. | 52/220.1 |
| 5,692,341 A * | 12/1997 | Erlandson | 52/27 |
| 6,061,910 A * | 5/2000 | Williamson | 29/897.312 |
| 6,101,773 A * | 8/2000 | Chau et al. | 52/220.7 |
| 6,128,872 A * | 10/2000 | Marshall et al. | 52/220.1 |
| 6,260,318 B1 * | 7/2001 | Herren | 52/317 |
| 6,332,299 B1 * | 12/2001 | Stewart, III | 52/696 |
| 6,378,263 B1 * | 4/2002 | Sobers | 52/514 |
| 6,389,762 B2 * | 5/2002 | Le Poire | 52/204.2 |
| 6,642,445 B1 | 11/2003 | Lalancette | |
| 6,732,481 B2 * | 5/2004 | Stahl, Sr. | 52/406.1 |
| 6,935,079 B1 | 8/2005 | Julian et al. | |
| 7,331,149 B2 * | 2/2008 | Tollenaar | 52/481.1 |
| 2009/0020329 A1 * | 1/2009 | Frenkel | 174/507 |

* cited by examiner

SYSTEMS AND METHODS FOR PROVIDING A UTILITY LINE PROTECTION PLATE

FIELD OF THE INVENTION

This invention relates to building construction, and in particular, relates to systems and methods for providing a utility line protection plate.

BACKGROUND OF THE INVENTION

In some instances, a builder or contractor installing siding, brick, or other wall-mounted materials may sometimes be careless in identifying specific locations of utility lines within a wall. In these instances, the builder or contractor may drive nails, bolts, or other penetrating objects into the wall and inadvertently puncture or otherwise damage utility lines within the wall. Sometimes the damage may go unnoticed as construction continues. Costly repairs and re-work may be needed including, but not limited to, drywall, paint, trim, flooring, mold remediation, and welding.

Conventional nail plates exist for protecting utilities in a wall. However, such conventional plates may be relatively small and may not suitably protect the utilities in the wall. In these instances, it may be necessary to install numerous nail plates to protect the utilities within a wall. The use of multiple, rather small plates can be time consuming to install since a contractor must mount each relatively small plate in the wall and over the utilities. If the contractor or builder uses multiple plates, each of the plates must be closely aligned or there may be exposed portions of utilities, which will remain unprotected from possible strikes from nails, bolts, or penetrating objects.

One type of conventional nail plate, a box nail plate, includes a series of spikes adjacent to the edges of the box nail plate. The box nail plate, via the spikes, can be driven into the surface of a wood stud over the location where an internal utility wire passes through the wood stud. In some instances, the spikes may be prone to bending or deflection if the box nail plate is not properly installed. In many instances, the box nail plate only protects the electrical wire in a relatively small area, and does not protect the remaining portion of the electrical wire, which can be a much greater length than that covered by the box nail plate. Even though multiple box nail plates can be used to cover other portions of the electrical wire, the associated spikes of the box nail plate are primarily suitable for mounting against a wood stud or other surface along which the electrical wire is located. Thus, the use of the box nail plate and similar types of nail plates to protect electrical wires or other types of utilities in other locations within a wall is limited.

Other examples of conventional nail plates exist with different shapes and configurations. However, such conventional nail plates can require multiple plates to fully protect utilities within a wall.

Therefore, a need exists for systems and methods for providing a utility line protection plate.

SUMMARY OF THE INVENTION

Systems and methods according to various aspects and embodiments of the invention address some or all of these issues and combinations of them. They do so by providing at least one system and method for protecting against exterior penetration of utility lines during residential and commercial construction activities. For example, a builder or contractor installing siding, brick, or other wall mounted materials may sometimes be careless in identifying specific locations of unprotected utility lines within a wall. In these instances, the contractor may drive nails, bolts, or other penetrating objects into the wall and inadvertently puncture or otherwise damage unprotected utility lines located within the wall. Embodiments of the invention can provide a utility line protection plate which can be installed during construction of a wall, and provide utility line protection against nails, bolts, or other penetrating objects subsequently driven into the wall. In one embodiment, a hinge associated with a utility line protection plate can permit the plate to be collapsed, or otherwise folded roughly in half, and transported to a construction site prior to installation.

Embodiments of the invention can include a system for providing a utility line protection plate can include at least two plate portions configured to resist impact of a penetrating object. The system can also include at least one hinge mounted to the at least two plate portions, wherein the at least one hinge permits the plate portions to be manipulated to a substantially parallel orientation with respect to each other. Furthermore, the system can include at least one mounting device adjacent to an edge of either of the at least two plate portions, wherein the mounting device is configured to permit mounting of the at least two plate portions between two adjacent wall studs.

In one aspect of this embodiment, the plate portions can include similar sized, rectangular-shaped steel plates or peg boards.

In another aspect of this embodiment, the plate portions can include dissimilar sized steel plates or peg boards.

In another aspect of this embodiment, the penetrating object can include at least one of the following: a nail, a rivet, a screw, or a bolt.

In another aspect of this embodiment, the plate portions can include ¼ inch thick steel plates or peg boards.

In another aspect of this embodiment, the at least one hinge mounts to a respective surface of each of the plate portions to permit the plate portions to be manipulated to a substantially coplanar orientation with respect to each other.

In another aspect of this embodiment, the mounting device can include an L-shaped clip with at least one hole in an extended portion of the clip, wherein the at least one hole can receive a fastening device.

Embodiments of the invention can also include a method for installing a utility line protection plate. The method can include manipulating a utility line protection plate via at least one connecting device. In addition, the method can include positioning the utility line protection plate adjacent to at least one utility line and between adjacent wood studs associated with a wall. Furthermore, the method can include mounting the utility line protection plate to at least one wood stud using at least one mounting device, wherein at least a portion of the utility line is covered by the utility line protection plate.

In one aspect of this embodiment, manipulating a utility line protection plate via at least one connecting device can include extending the utility line protection plate by manipulating two plate pieces connected to each other via the at least one connecting device.

In another aspect of this embodiment, positioning the utility line protection plate adjacent to at least one utility line and between adjacent wood studs associated with a wall can include substantially covering at least a portion of the at least one utility line.

In another aspect of this embodiment, mounting the utility line protection plate to at least one wood stud using at least one mounting device can include driving a fastening device into an associated hole associated with the at least one mounting device, wherein the fastening device substantially contacts the at least one wood stud.

In another aspect of this embodiment, mounting the utility line protection plate to at least one wood stud using at least one mounting device can include using a plurality of mounting devices.

In another aspect of this embodiment, the utility line protection plate can include similar sized, rectangular-shaped steel plates or peg boards.

In another aspect of this embodiment, the utility line protection plate can include dissimilar sized steel plates or peg boards.

In another aspect of this embodiment, the utility line protection plate is capable of resisting penetration by a penetrating object comprising at least one of the following: a nail, a rivet, a screw, or a bolt.

In another aspect of this embodiment, the utility line protection plate can include at least one ¼ inch thick steel plate or peg board.

In another aspect of this embodiment, the at least one connecting device can include at least one of the following: at least one hinge mounted to a surface of the utility line protection plate, or at least one interconnecting device adjacent to an edge of the utility line protection plate.

In another aspect of this embodiment, the at least one mounting device can include an L-shaped clip with at least one hole in an extended portion of the clip, wherein the at least one hole can receive a fastening device.

In yet another embodiment, a method for protecting a utility line between two adjacent wood studs is provided. The method includes manipulating a utility line protection plate to an extended position. The method also includes positioning the utility line protection plate adjacent to the utility line and between the adjacent wood studs. Furthermore, the method includes mounting the utility line protection plate to at least one wood stud using at least one mounting device, wherein at least a portion of the utility line is covered by the utility line protection plate.

In one aspect of this embodiment, manipulating a utility line protection plate to an extended position can include rotating one associated plate portion about a connecting device mounted to another associated plate portion, wherein the two associated plate portions are substantially coplanar with each other. In another embodiment, a system for providing a utility line protection plate is provided. The system can include at least two plate portions configured to resist impact of a penetrating object. In addition, the system can include at least one interconnecting device capable of adjoining the at least two plate portions, wherein the at least one interconnecting device permits the plate portions to be manipulated to a substantially parallel orientation with respect to each other. Furthermore, the system can include at least one mounting device adjacent to an edge of either of the at least two plate portions, wherein the mounting device is configured to permit mounting of the at least two plate portions between two adjacent wall studs.

In one aspect of this embodiment, the at least one interconnecting device can include a tongue and corresponding groove combination.

In another aspect of this embodiment, the at least one interconnecting device comprises a rounded surface and detent structure.

Other systems and methods according to various embodiments of the invention will become apparent with respect to the remainder of this document.

DETAILED DESCRIPTION OF EMBODIMENTS

Embodiments of the invention relate to systems and methods for providing a utility line protection plate. In one embodiment, a system can provide a utility line protection plate for protecting against exterior nail penetration of utility lines during residential and commercial construction activities. Embodiments of a utility line protection plate can be used to protect various utility lines including HVAC, plumbing, electrical, communications, or other utilities.

The term "utility" can be defined herein as HVAC, plumbing, electrical, communications, stereo, or network.

The term "line" or "lines" can be used interchangeably to mean wires, tubes, pipes, cables, lines, ducts, or connections.

Figure 1:
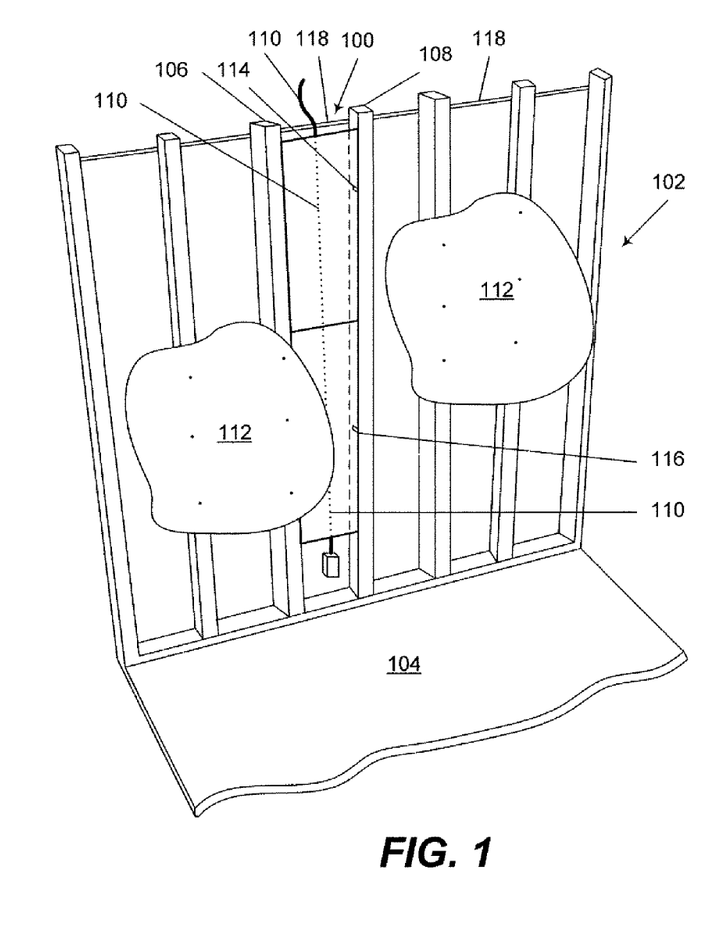
FIG. 1 is an illustration of an example environment and system according to one embodiment of the invention.

An example environment and system in accordance with an embodiment of the invention are shown in FIG. 1. FIG. 1 illustrates an example environment for an example system 100 in accordance with various embodiments of the invention. In the example shown, the environment can be a wall 102 of a building 104.

In one embodiment of the invention, shown in FIG. 1, a system 100 can be installed with respect to a pair of wall studs, such as 106, 108. As shown in this example, the wall studs 106, 108 can be part of a wall 102 associated with a building 104. The system 100 can be installed adjacent to a utility line 110 within the wall 102 and between the wall studs 106, 108, such that the system 100 is mounted between the utility line 110 and a sheet of wall-mounted sheet rock or particle board 112. In particular, a series of mounting devices, such as L-shaped clips 114, 116, can be used to mount a various portions of the system 100 to the wall studs 106, 108. When the system 100 is mounted adjacent to the utility line 110, the system 100 provides protection against objects, such as nails, rivets, screws, and bolts, which may be driven into the sheet rock or particle board 112. For instance, if a nail, rivet, screw, bolt, or other penetrating object is driven into the sheet rock or particle board 112 between the wall studs 106, 108, the system 100 can provide a relatively strong barrier to protect the utility line 110 from a nail, bolt, or other penetrating object. In this manner, the system 100 may repel or otherwise resist an impact from a nail, rivet, screw, bolt, or other penetrating object being driven into the wall 102, and the utility line 110 may avoid being punctured, damaged, or otherwise penetrated.

In one embodiment, a system, such as 100, can be installed between the utility line 110 and an exterior wall, panel, or sheet of oriented strand board (OSB), such as exterior wall 118. In the example shown, a system 100 is positioned with respect to one side of the utility line 110. However, it will be apparent that a system, such as 100, can be positioned with respect to other sides of the utility line 110, including adjacent to an exterior wall, such as 118. In this manner, additional protection for the utility line can be provided.

Typically, embodiments of the system can be mounted within a wall of a building, such as wall 102 of building 104. Other embodiments can be mounted within a floor, ceiling, or other area of a building where utility lines may be exposed to possible penetration from nails, rivets, screws, bolts, or other objects.

The configuration and arrangement of the components shown and described with respect to FIG. 1 is shown by way of example only, and other configurations and arrangements of system components can exist in accordance with other embodiments of the invention.

Figure 2:
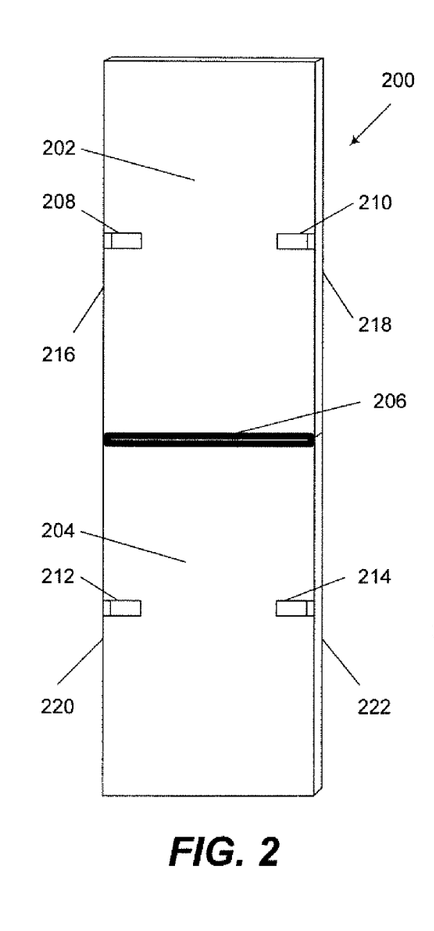
FIG. 2 is an example system shown in an extended orientation according to one embodiment of the invention.

FIG. 2 illustrates an example system or utility line protection plate 200, similar to system 100 shown in FIG. 1. The utility line protection plate 200 shown in FIG. 2 includes two similar rectangular-shaped, relatively flat plate pieces 202, 204. In this example, each of the two plate pieces 200, 202 can be connected to each other with at least one connecting device, such as a hinge 206, which permits the two plate pieces 202, 204 to be moved with respect to each other. The utility line protection plate 200 is shown in an extended orientation or position. In one embodiment, two plate pieces 202, 204 can be made from approximately ¼ inch (0.6 cm) thick relatively hard material, such as steel or a peg board. Various metals or other substantially strong and durable materials can be used for a utility line protection plate.

Other shapes of plate pieces can be used with other embodiments, including shapes such as square, circular, triangular, or other geometries. In some embodiments, the relatively flat plates can be replaced with angular or channeled pieces, or other shapes of configurations depending on the available space between adjacent wood studs or within a wall, ceiling, or floor.

Since adjacent wall studs, similar to 104 and 106 in FIG. 1, may be different widths apart and different heights depending on the building construction, approximate dimensions of a utility line protection plate can be modified accordingly to fit between different wall stud configurations. An example dimension for a system or utility line protection plate shown in FIG. 2 can be approximately 8 inches (20.3 cm) wide by 8 feet (2.4 m) high by ¼ inches (0.6 cm) thick, with each plate piece having a dimension of approximately 8 inches (20.3 cm) wide by 4 feet (1.2 m) high by ¼ inches (0.6 cm) thick. Other width dimensions for a system embodiment or utility line protection plate can be approximately 12 inches (30.5 cm), 16 inches (40.6 cm), or 24 inches (61 cm). Other height dimensions for a system embodiment or utility line protection plate can be approximately 9 feet (2.7 m) and 10 feet (3.0 m). Other thickness dimensions for a utility line protection plate can include various gauge sizes of sheet metal, including 3, 4, 5, or 6 gauge sheet metal. Other approximate width, height, and thickness dimensions, and shapes for a system embodiment or utility line protection plate can exist according to other embodiments of the invention.

Figure 3:
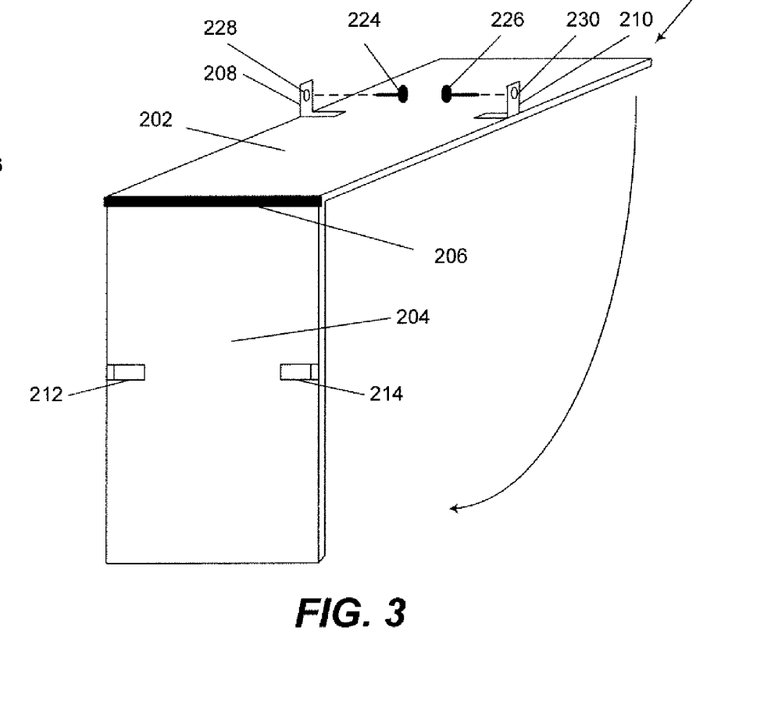
FIG. 3 is the example system of FIG. 2 according to one embodiment of the invention.

The connecting device or hinge 206 permits the two plate pieces 202, 204 to be moved with respect to each other as shown in FIG. 3. The utility line protection plate 200 in FIG. 3 is shown in another extended orientation or position. In this embodiment, the hinge 206 is mounted adjacent to an edge of each of the plate pieces 202, 204.

Figure 4:
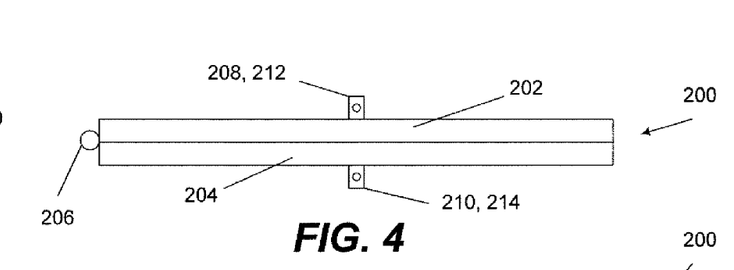
FIG. 4 is the example system of FIG. 2 shown in a collapsed orientation according to one embodiment of the invention.

When the two plate pieces 202, 204 are moved into a parallel relation to each other as shown in FIG. 4, the utility line protection plate 200 folds roughly in half, in a collapsed orientation or position, for ease of transportation. Likewise, as shown in FIGS. 1 and 2, when the two plate pieces 202, 204 are oriented in a coplanar relation to each other, the utility line protection plate 200 can be positioned over various utility lines running between two vertically oriented and spaced apart wall studs, such as 104, 106, in a wall of a building, such as the wall 102 in building 104 in FIG. 1.

In another embodiment, more than one hinge or connecting device can be used to connect the two plate pieces 202, 204 together such that the plate pieces 202, 204 can be moved with respect to each other similar to the movement shown in FIG. 3. In yet another embodiment, any number of hinges or connecting devices can be used to connect multiple plate pieces together to permit the overall extended configuration of plate pieces to be folded into a relatively smaller, collapsed configuration. In any instance, when a utility line protection plate or multiple plates comprising the utility line protection plate is in a collapsed orientation or position, the utility line protection plate or multiple plates can be transported relatively easier than when the utility line protection plate or multiple plates are in an extended orientation or position.

Mounting devices, such as L-shaped clips 208, 210, 212, 214, are shown mounted adjacent to the respective lateral sides 216, 218, 220, 222 of the rectangular-shaped plate pieces 202, 204. In the example shown in FIG. 2, the L-shaped clips 208, 210, 212, 214 can be made from steel, and the clips 208, 210, 212, 214 can be welded or otherwise connected to a surface of the utility line protection plate 200. Various metals or other substantially strong and durable materials can be used for mounting devices.

In the embodiment shown, each of the L-shaped clips 208, 210, 212, 214 are spaced approximately half way down each respective lateral side 216, 218, 220, 222 of the plate pieces 202, 204. In other embodiments, a mounting device or L-shaped clip can be adapted to mount to any portion of a plate piece, and may be further adapted to mount to any portion of a wall, ceiling, or floor of a building.

At least one nail, bolt, or other fastening device, such as nails 224, 226, can be mounted through a hole, such as 228, 230, associated with L-shaped clips 208, 210. Other similar sized holes (not shown) can be machined in each of the other L-shaped clips for use with a nail, bolt, or other fastening device, such as nails 224, 226. Each of the mounting devices or L-shaped clips 208, 210, 212, 214 can be adapted to mount to both a surface of one of the plate pieces, such as 202, 204, and at least one wall stud, such as 106, 108 in FIG. 1. For example, nail 224, can be positioned in hole 228 of L-shaped clip 208, and the clip 208 can be mounted to a wall stud, such as 106, by driving the nail 224 into the wall stud 106 to mount a portion of the plate piece 202 to the wall stud 106. Likewise, nails similar to 224 and 226 can be positioned in other holes for the other clips 210, 212, 214, and the clips 210, 212, 214 can be mounted to a wall stud, such as 106 or 108, by driving the respective nails into the wall studs 106, 108 to mount other portions of the plate pieces 202, 204 to the wall studs 106, 108. Other embodiments of mounting devices or L-shaped clips can utilize other hole configurations or other devices to mount the plate pieces, such as 202, 204, to a wood stud, such as 104, 106.

In one embodiment, a utility line protection plate such as 200 can be in a fully extended position, where the plate pieces 202, 204 are substantially coplanar with each other as shown in FIG. 1, and nails such as 224, 226 can be mounted through holes 228, 230 in clips 208, 210 to mount the utility line protection plate 200 to wood studs, such as 106, 108.

In another embodiment, a utility line protection plate such as 200 can be in a partially extended position, where the plate pieces 202, 204 are neither coplanar with each other nor are the plate pieces 202, 204 substantially parallel with each other as shown in FIG. 4, and nails such as 224, 226 can be mounted through holes 228, 230 in clips 208, 210 to mount the utility line protection plate 200 to wood studs, such as 106, 108.

FIGS. 2-4 illustrate examples of a system or utility line protection plate in accordance with an embodiment of the invention. Other examples and configurations for a system or utility line protection plate can exist in other embodiments of the invention.

Figure 5:
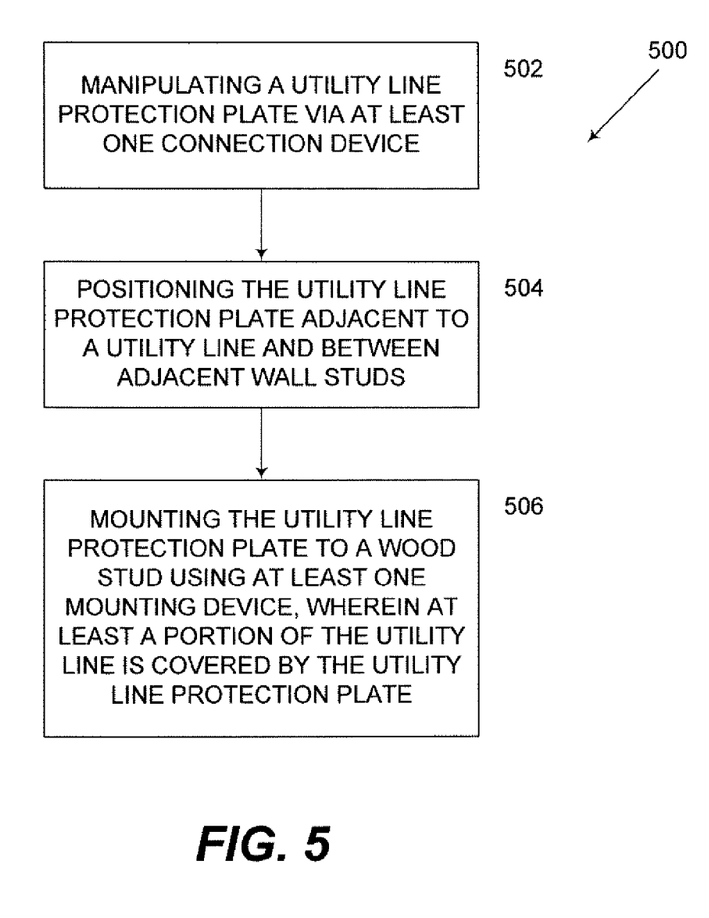
FIG. 5 is a flowchart for an example method according to one embodiment of the invention.

Using a system or utility line protection plate as illustrated in FIGS. 1-4, the example method 500 described in FIG. 5 can be implemented. The method 500 of FIG. 5 begins at block 502.

In block 502, a utility line protection plate is manipulated via at least one connecting device. In this embodiment, a utility line protection plate, such as 200 in FIG. 2, can be manipulated from a collapsed orientation, shown in FIG. 4, to any number of extended orientations, shown in FIGS. 1-3. By way of at least one connecting device, such as a hinge 206 shown in FIG. 2, the utility line protection plate 200 can be manipulated into an extended orientation or position. In one embodiment, the at least one connecting device can be an interconnecting device, such as a tongue and corresponding groove, shown as 606 and 608 in FIG. 6.

Block 502 is followed by block 504, in which the utility line protection plate is positioned adjacent to a utility line and between adjacent wood studs associated with a wall. In this embodiment, the utility line protection plate 200 can be inserted within a wall and between adjacent wall studs, such as 106 and 108 in FIG. 1, to cover a substantial portion of a utility line, such as 110, within the wall. In one embodiment, a second utility line protection plate can be positioned adjacent to the utility line and between adjacent wood studs, such that the second utility line protection plate covers another portion of the utility line than the initial utility line protection plate.

Block 504 is followed by block 506, in which at least one mounting device is used to mount the utility line protection plate to at least one wood stud, wherein at least a portion of the utility line is covered by the utility line protection plate. In this embodiment, one or more mounting devices, such as an L-shaped clip 208 in FIG. 2, can be used to mount a portion of the utility line protection plate 200 to a portion of a wood stud, such as 106 in FIG. 1. For example, the utility line protection plate 200 in FIGS. 2-4 utilize a series of 4 L-shaped clips, 208, 210, 212, 214, to mount the plate 200 to adjacent wood studs.

The method 500 ends at block 506.

The methods disclosed herein are by way of example only, and other methods in accordance with embodiments of the invention can include other elements or steps, including fewer or greater numbers of element or steps than the example methods described herein.

Figure 6:
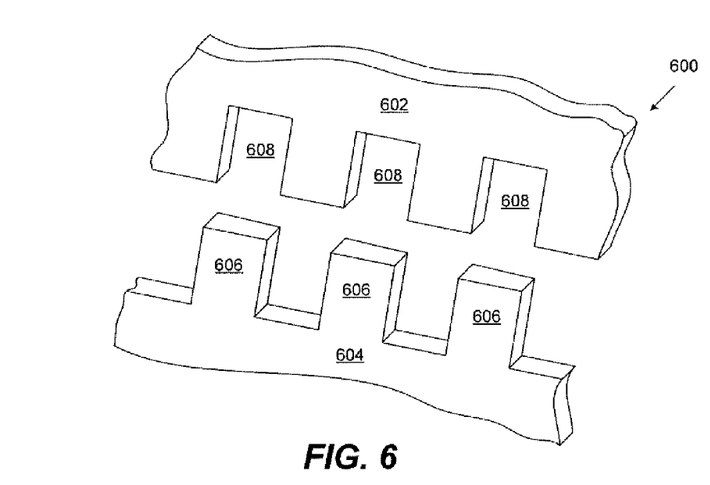
FIG. 6 is another example system according to one embodiment of the invention.

Another example system in accordance with an embodiment of the invention is shown in FIG. 6. In FIG. 6, an example system or utility line protection plate 600, similar to systems 100, 200 shown in respective FIGS. 1 and 2, can be installed with respect to a wall of a building, similar to those shown in FIG. 1. The utility line protection plate 600 shown in FIG. 6 includes two similar rectangular-shaped, relatively flat plate pieces 602, 604 (which are shown in part in FIG. 6, but can be a similar size to those in FIGS. 1 or 2). In this example, each of the two plate pieces 602, 604 can be interconnected with each other via one or more interconnecting devices, such as a relatively square-shaped tongue 606 and corresponding square-shaped groove 608. The interconnecting devices, such as 606, 608, can permit the two plate pieces 602, 604 to be moved with respect to each other as well as to be fit relatively snug to each other. In this example, at least three tongue and corresponding grooves are shown. In other embodiments, any number of interconnecting devices, such as a tongue and grooves, can exist.

In one embodiment, interconnecting devices can be a series of devices, for instance, multiple tongues and corresponding grooves evenly spaced adjacent to the edges of the adjoining flat plate pieces 602, 604. In another embodiment, interconnecting devices can be a series of devices, for example, multiple tongues and corresponding grooves spaced at different distances adjacent to the edges of the adjoining flat plate pieces 602, 604.

In other embodiments, interconnecting devices can have other configurations or shapes, such as triangular, rectangular, oval, circular, polygonal, or any combination thereof. Essentially, any configuration or shape used for an interconnecting device should permit two adjoining plate pieces, such as 602, 604, to be moved with respect to each other as well as to be fit relatively snug to each other.

In one embodiment, a pair of interconnecting devices, such as a relatively square-shaped tongue and corresponding square-shaped groove, can include a rounded surface and detent structure which permits the adjoining plate pieces, such as 602, 604, to be "snap" fit together, yet permitting the plate pieces to be moved with respect to each other as well as to be fit relatively snug to each other. For example, a rounded surface could be machined or mounted to an edge of a tongue, such as 606, associated with one plate piece, such as 602. A corresponding detent structure can be machined or mounted to an edge of a corresponding groove, such as 608, associated with another plate piece, such as 604, such that when the tongue 606 and corresponding groove 608 are mounted together, the rounded surface mounts to the corresponding detent structure.

Figure 7:
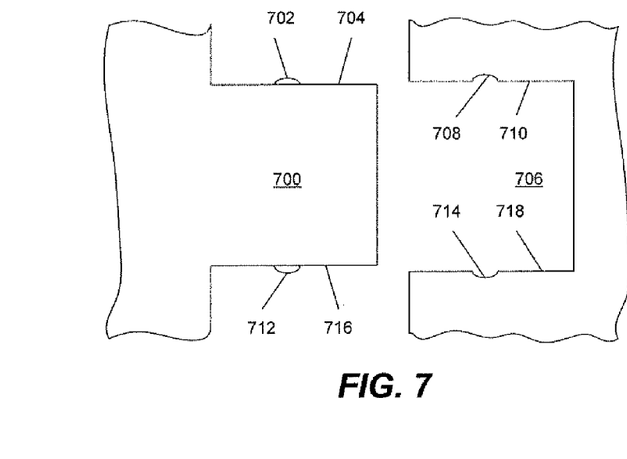
FIG. 7 is an example rounded surface and detent structure for a system according to one embodiment of the invention.

An example of a rounded surface and corresponding detent structure for an example tongue and groove combination is shown in FIG. 7. The example combination can be used with a tongue and groove shown in FIG. 6, or with any other type of interconnecting device described herein. As shown in FIG. 7, a tongue 700 can have a rounded surface 702 on a lateral side 704, and groove 706 can have a corresponding detent structure 708 within a lateral side 710 of the groove 706. This example shows an opposing rounded surface 712 and detent structure 714 associated with opposing lateral sides 716, 718 of the tongue 700 and groove 706.

In other embodiments, any number of similar types of devices, surfaces, or structures can be used to permit adjoining plate pieces to be "snap" fit together, yet permitting the plate pieces to be moved with respect to each other as well as to be fit relatively snug to each other. In one embodiment, a rounded surface can be a ball or spherical shape embedded in the surface of a tongue or other interconnecting device. In another embodiment, a detent structure can be a trough or notch machined in the surface of a groove or other interconnecting device. In other embodiments, a rounded surface and detent structure can be interchanged, or used in various combinations together or with other similar types of devices, surfaces, or structures.

While the above description contains many specifics, these specifics should not be construed as limitations on the scope of the invention, but merely as exemplifications of the disclosed embodiments. Those skilled in the art will envision many other possible variations that are within the scope of the invention as defined by the claims appended hereto.

The claimed invention is:

1. A system for providing a utility line protection plate, comprising:
    at least two plate portions configured to resist impact of a penetrating object;
    at least one tongue-and-groove hinge mounted to the at least two plate portions, wherein the at least one tongue-and-groove hinge is configured to permit moving the plate portions between an extended position and a collapsed position, the plates being in a substantially parallel orientation with respect to each other when in the extended position and the plates being folded upon each other when in the collapsed position; and
    at least one mounting device adjacent to an edge of either of the at least two plate portions, wherein the mounting device is configured to permit mounting of the at least two plate portions between two adjacent wall studs.

2. The system of claim 1, wherein the plate portions comprise similar sized, rectangular-shaped steel plates.

3. The system of claim 1, wherein the plate portions comprise dissimilar sized steel plates or peg boards.

4. The system of claim 1, wherein the penetrating object comprises at least one of the following: a nail, a rivet, a screw, or a bolt.

5. The system of claim 1, wherein the plate portions comprise ¼ inch thick steel plates or peg boards.

6. The system of claim 1, wherein the at least one tongue-and-groove hinge mounts to a respective surface of each of the plate portions to permit the plate portions to be manipulated to a substantially coplanar orientation with respect to each other.

7. The system of claim 1, wherein the mounting device comprises an L-shaped clip with at least one hole in an extended portion of the clip, wherein the at least one hole can receive a fastening device.

* * * * *